US012724409B2

(12) United States Patent
Mammadov et al.

(10) Patent No.: US 12,724,409 B2
(45) Date of Patent: Sep. 1, 2026

(54) WEAR SCANNING OF SCREENING AND OTHER ORE TREATMENT DECKS

(71) Applicant: SANDVIK ROCK PROCESSING AUSTRALIA PTY LIMITED, North Ryde (AU)

(72) Inventors: Asad Mammadov, North Ryde (AU); Morgan Vine, North Ryde (AU); Steven Russell, North Ryde (AU); Benjamin Poole, North Ryde (AU)

(73) Assignee: Sandvik Rock Processing Australia Pty Limited, North Ryde (AU)

( * ) Notice: Subject to any disclaimer, the term of this patent is extended or adjusted under 35 U.S.C. 154(b) by 397 days.

(21) Appl. No.: 18/258,050

(22) PCT Filed: Dec. 16, 2021

(86) PCT No.: PCT/AU2021/051499
§ 371 (c)(1),
(2) Date: Jun. 16, 2023

(87) PCT Pub. No.: WO2022/126191
PCT Pub. Date: Jun. 23, 2022

(65) Prior Publication Data

US 2023/0367317 A1 Nov. 16, 2023

(30) Foreign Application Priority Data

Dec. 18, 2020 (AU) ................................ 2020904722
May 18, 2021 (AU) ................................ 2021901477

(51) Int. Cl.
*G05D 1/221* (2024.01)
*G05D 1/00* (2006.01)
(Continued)

(52) U.S. Cl.
CPC ......... *G05D 1/0212* (2013.01); *G05D 1/0276* (2013.01); *G05D 1/221* (2024.01);
(Continued)

(58) Field of Classification Search
CPC .... G05D 1/221; G05D 1/0276; G05D 1/0071; G05D 1/43; G05D 1/646; G05D 1/0212;
(Continued)

(56) References Cited

U.S. PATENT DOCUMENTS 9,051,028 B2 * 6/2015 Smith .................. B62D 55/265
9,789,612 B2 10/2017 Hoffman et al.
(Continued)

FOREIGN PATENT DOCUMENTS

AU 2018101830 A4 * 1/2019
WO 2018005185 A1 1/2018
WO 2020220093 A1 11/2020

OTHER PUBLICATIONS

International search report for PCT/AU2021/051499 mailed on Feb. 14, 2022.
(Continued)

*Primary Examiner* — Dino Kujundzic
(74) *Attorney, Agent, or Firm* — Corinne R. Gorski

(57) ABSTRACT

The present specification discloses a mobile scanning device (30) for scanning wear conditions of treatment panel modules (13) of a treatment deck (14) in vibratory treatment apparatus (10), the mobile scanning device (30) including a support structure (11), steerable transport means (12) carrying the support structure (11) along a predefined course or a selectable steered course on or over the treatment deck (14), the support structure (11) carrying power means (16), drive means (17) powered by the power means (16) to drive the steerable transport means (12) scanning means (18) to scan a lower zone (42) below the support structure (11) to
(Continued)

establish scanned information, the scanned information being reflective of at least wear levels occurring on the upper surfaces (31) of the treatment panel modules (13), and transmission means (23) arranged to transmit the scanned information to remote control means (20, 21) external of the treatment deck (14).

19 Claims, 8 Drawing Sheets

(51) Int. Cl.

| | |
|---|---|
| *B64U 10/60* | (2023.01) |
| *B64U 60/60* | (2023.01) |
| *B64U 101/26* | (2023.01) |
| *B64U 101/30* | (2023.01) |

(52) U.S. Cl.
CPC .............. *B64U 10/60* (2023.01); *B64U 60/60* (2023.01); *B64U 2101/26* (2023.01); *B64U 2101/30* (2023.01); *B64U 2201/20* (2023.01)

(58) Field of Classification Search
CPC ............ B64U 2201/20; B64U 2101/25; G05B 2219/45066
See application file for complete search history.

(56) References Cited

U.S. PATENT DOCUMENTS

| | | | | |
|---|---|---|---|---|
| 9,805,261 | B1 * | 10/2017 | Loveland | B64F 5/60 |
| 11,726,502 | B2 * | 8/2023 | Johnson | B64U 10/14 701/2 |
| 2013/0169794 | A1 * | 7/2013 | Shimomura | E01C 23/01 348/128 |
| 2018/0313715 | A1 * | 11/2018 | Cichosz | B60B 19/006 |
| 2019/0017970 | A1 | 1/2019 | Simpson et al. | |

OTHER PUBLICATIONS

Managing screens and screen maintenance in extractive mining, First published Feb. 2017, pp. 34-37, NSW Department of Industry, Skills and Regional Development; retrieved from internet on Feb. 4, 2022 at URL < https://www.resourcesregu]ator,nsw.gov.au/sites/default/files/documents/guideline-managing-screens-and-screen-maintenance.pdf > pp. 34-37.

Grehl et al., Mining-RoX—Mobile Robots in Underground Mining—Conference Paper. Third International Future Mining Conference, Sydney, Nov. 2015, https://www.researchgate.net/publication/281549026_Minmg-RoX_-Mobile_Robots_in_Underground_Mining whole document Anonymous: “Managing screens and screen maintenance in extracitve mining”. Guide-Screens and Screen Maintenance, Feb. 1, 2017, pp. 1-41, XP 055947558, Retrieved from the internet: URL: https://www.resourcesregulator.nsw.gov.au/sites/default/files/documents/duideline-managing-screens-and-screen-maintanence.pdf.

* cited by examiner 102
105
105
10
108
100
101
113
112
111
106
114
113
109
101
103
110
114
104
104

WEAR SCANNING OF SCREENING AND OTHER ORE TREATMENT DECKS

CROSS-REFERENCE TO RELATED APPLICATIONS

This is a 35 U.S.C. 371 National Stage Patent Application of International Application No. PCT/AU2021/051499, filed Dec. 16, 2021, which claims priority to Australian application 2021901477, filed May 18, 2021, and Australian application 2020904722, filed Dec. 18, 2020, each of which is hereby incorporated by reference in its entirety.

TECHNICAL FIELD

The present development relates to the field of determining wear levels and other damage levels to treatment panel modules of an array of such treatment panel modules in a side by side configuration forming a treatment deck of ore or quarry material treatment apparatus, to assist with restoration of the treatment deck and surrounds to a condition fit for operational use.

Throughout this specification including the accompanying patent claims, terms such as "treatment panel module(s)" is intended to include screening panel module(s), dewatering panel module(s) and impact panel module(s), and "treatment deck(s)" is intended to include screening deck(s), dewatering deck(s) and impact deck(s). "Treatment apparatus" is intended to identify apparatus having one or more treatment deck(s) as aforesaid.

BACKGROUND ART

Screening or other similar treatment apparatus for mined ore or quarry materials commonly utilise treatment decks comprised in part by treatment panel modules located in a side by side array generally abutting one another and secured by various fixing elements along abutting edge regions to underlying rails normally running in a longitudinal direction of the treatment deck. A commonly utilised fixing system utilises fixing elements being a securing pin fitting into a bore established in confronting edge faces of abutting edge regions of the treatment panel modules. The securing pin passing into the bore and through an opening in the underlying supporting rail to fix underneath the rail either directly or indirectly via downwardly projecting parts of the treatment panel modules. Fastening pin types made in two parts comprising a bush and a separate center pin where there is no panel lug that goes through the opening in the underlying supporting rail, are also known. This is more commonly used in heavier loading applications. Other fixing systems are also used where securing pins are not used and some other form of securing method is employed including snap in fittings. Clip on type fastening arrangements are utilised at spot locations similar to securing pins via supporting deck rail openings. Clip on type arrangements are also used where a panel has an entire edge clipped by a fixing element and the fixing element is a long member that is fastened onto the deck rail openings, or in some deck arrangements, directly to underlying cross support beams where there may not be deck supporting rails. Brand names for some of these fastening arrangements include "poly-snap", "CP-HDB", "KBX", "H-Pin" and "HDK-Pin".

Screening and other similar ore or quarry material treatment apparatus may also include cover parts positioned between lower surfaces of the treatment panel modules and upper surfaces of a supporting structure for the treatment panel modules. The cover parts may also include sections that comprise or take some part in the fastening of the treatment panel modules to the underlying supporting structure. These cover parts are commonly made of similar materials to those forming outer surface regions of the treatment panel modules and can also be subject to wear and damage during use of ore or quarry material treatment apparatus.

The development of modular treatment deck structures has occurred over a lengthy period of time as treatment decks, in use, tend to wear in an uneven manner. Using a modular treatment deck structure allows selected individual worn treatment panel modules to be removed and replaced rather than having to replace the whole treatment deck.

In this type of screening or other similar treatment apparatus, it is relatively common for the treatment panel modules to be constructed from moulded high strength hard wearing elastomers and polymer materials including, but not limited to, polyurethane, polyamide, ultra high molecular weight polyethylene, and rubber materials. In some instances, multiple such materials may be used. The moulded materials may be moulded over a sub-frame of a suitable metal such as steel or steel alloy. It is also relatively common for these treatment panel modules to have a square or rectangular plan configuration with the most typical sizes being 1 ft×1 ft or 1 ft×2 ft or in metric sizes of 0.3 m×0.3 m and 0.3 m×0.6 m. The treatment panel modules may present a solid upwardly facing surface onto which the mined ore or similar material is dropped in use or alternatively various openings or apertures communicating via through passages of varying sizes and shapes to an underneath region could be provided. The purpose of these openings or apertures is to pass ore or similar particles below a certain size to a lower zone, commonly a second treatment deck as a screening process. The upwardly facing surface may be generally flat or may include localised upwardly facing projections such as bars or individual projecting elements separated by valleys or gutters.

It is of course the moulded material of these treatment panel modules that primarily wears to varying degrees during use. However, some treatment panel modules can have a treatment surface that has exposed other material areas such as, for example, hard ceramic material inserts, that will also wear during use of treatment apparatus of this kind. Further, wear can occur to a stage where reinforcing metal frame work of the panel module is revealed and, if this occurs, this metal frame work can also wear. The wear that does occur, tends to occur to varying degrees across individual panel modules as well as across a treatment deck consisting of an array of such panel modules. At present establishing the degree of wear is generally achieved by visual observation. There have been a number of attempts to assist with wear assessment by visual observation and these include, for example, providing inserted materials such as differing colours in the moulded material at differing depths from the upward facing upper surface, providing transmittable sensors at various depth levels, and providing apertures or other inclusions that change in shape or size at a design distance from the upper surface indicative of wear reaching a stage where the treatment panel module should be replaced.

Treatment apparatus may have treatment decks that are disposed horizontally, however, it is relatively more common for the treatment deck, particularly with screening apparatus, to have a generally concave curved upwardly facing surface which is often steeper at an infeed end rather than the opposed exit or discharge end.

One difficulty experienced with treatment apparatus of the above discussed type is that they will often include a stack of treatment decks, that is, one being arranged generally above the other with quite limited physical space between treatment decks. Moreover, often the structure of such treatment apparatus is such that, even with the uppermost deck, there are machine structured parts that limit the space available above this deck. Often environmental lighting is not good and the closely positioned nature of stacked treatment decks often together with the curved configuration of the treatment deck further adversely affects viewability of the treatment decks. These factors can result in work personnel having to crawl into confined spaces positioned between treatment decks or onto a limited space zone above the uppermost treatment deck to assess wear occurrence on the treatment panel modules and other issues including other damage to and around the treatment deck, and also potential damage to the treatment deck positioned immediately above. These problems are further exacerbated if the work personnel need to undertake renovation work such as replacing one or more treatment panel modules which, at present, is essentially a manual task with the assistance of manually operated tools. Dangers are also presented to work personnel if they have to get themselves from an upper deck to a lower deck or get materials or tools between decks or from the decks to external zones.

An objective of the present disclosure is to provide both a method of and apparatus for assessing wear levels of individual treatment panel modules of a treatment deck in treatment apparatus without the need to undertake visual checks by personally entering confined spaces in the treatment apparatus, such as the space between two adjacent treatment decks in a stack of such treatment decks or limited space above an uppermost treatment deck. A preferred objective is to provide a mobile scanning device capable of assessing upper surfaces of treatment panel modules in a treatment deck of treatment apparatus to determine wear levels and to transmit wear level data to an external monitoring means. Preferably, the mobile scanning device will also be capable of assessing wear and damage levels of other parts of the treatment deck/treatment apparatus and transmit data relating thereto to the external monitoring system.

SUMMARY OF THE INVENTION

According to a first aspect of this disclosure there is provided a method of determining wear levels of individual treatment panel modules positioned in adjacent side by side relationship to form a treatment deck, said method providing a remotely controllable treatment deck wear scanning device and positioning same on or over upwardly facing surfaces of said treatment panel modules forming an upwardly facing surface of said treatment deck, said treatment deck wear scanning device carrying wear scanning means operatively directed towards said treatment deck, said method including remotely moving said treatment deck wear scanning device along a selectable or predefined course on or over said treatment deck whereby said wear scanning means establishes scanned wear information data indicative of wear levels of the upwardly facing surfaces of at least some of said individual treatment panel modules.

Preferably, in one aspect, the treatment deck wear scanning device is operatively moved, at least in part, by transport means contacting said treatment deck, or by contacting guide tracks positioned adjacent said treatment deck.

In a possible alternative preferred embodiment, the treatment deck wear scanning device may be operatively moved by transport means arranged to elevate said treatment deck wear scanning device above said treatment deck during at least a portion of operational movement along said selectable or predefined course. In one arrangement, the wear scanning means is operable to establish said scanned wear information data while elevated above said treatment deck. In another possible arrangement, the treatment deck wear scanning device may be operationally moved along said selectable or predefined course between spaced first positions where the treatment deck wear scanning device is stationary and supported on said treatment deck separated by movement sections where the treatment deck wear scanning device is elevated above said treatment deck. Conveniently, the wear scanning means may be operational at some or all of the spaced first positions. Alternatively, the wear scanning means may be operational while elevated and moving between at least some of said first positions. In a further possible alternative, the wear scanning means may be maintained substantially stationary in an elevated position when establishing scanned wear information data.

In a further preferred aspect, the wear scanned wear information data is transferable to operational control means. The operational control means may, at least partly, be carried by the treatment deck wear scanning device. The operational control means may include an operational control means section positioned remotely from said treatment deck. Preferably, the wear scanned wear information data is transferrable to said remote operational control means section as the data is established during operational use of the treatment deck wear scanning device. In a possible alternative, the wear scanned wear information data may be transferrable to the remote operational control means section after the treatment deck wear scanning device is moved externally of the treatment deck being assessed.

Preferably, the scanned wear information data is established by comparing scanned wear information data sampled after a period of operational use of said treatment deck with similar data established prior to said operational use of said treatment deck. This may be utilised with any of the described alternative wear scanning methods.

In one preferred embodiment, the scanned wear information data may include establishing, by use of said wear scanning means, a decrease in surface level of at least a portion of the upwardly facing surface of a said treatment panel module after use of the treatment deck including said treatment panel module. Preferably, the decrease in surface level of at least a portion of the upwardly facing surface is compared to a pre-existing surface level prior to a period of use of the treatment deck, to establish a wear level of the treatment panel module to determine if that wear level is sufficient to require replacement of the treatment panel module. In another possible preferred embodiment, the wear scanned wear information data might include establishing, by use of said wear scanning means, either or both:

- a variation in size and/or shape of at least one pre-existing discrete aperture or recess extending downwardly from the upwardly facing surface of a said treatment panel module;
- a variation in size and/or shape of a lands or ligaments existing between pre-existing discrete apertures or recesses extending downwardly from the upwardly facing surface of a said treatment panel module,
- after a period of operational use that would indicate an unacceptable level of wear.

Preferably, the level of wear is established by comparing the wear scanned information to a pre-existing dimensional characteristic or configuration prior to a period of use of the treatment deck to determine if the level of wear is sufficient to require replacement of the treatment panel module.

In accordance with a second aspect of this disclosure there is provided a mobile treatment deck wear scanning device either as an independent item or when used on a treatment deck, the mobile treatment deck wear scanning device including a support structure, transport means arranged to carry said support structure over a selectable course or a predefined course on or over an upwardly facing surface of a treatment deck having a plurality of adjacent treatment panel modules positioned in side by side relationship each of said treatment panel modules having, in use, an upwardly facing surface which together form the upwardly facing surface of the treatment deck, said mobile treatment deck scanning device including:

- power means;
- said transport means being powered by said power means arranged to move said support structure over said predefined course or said selectable course;
- wear scanning means carried by said support structure including, at least, a first scanning device first wear scanning device to scan at least a lower zone below said support structure, said lower zone including said upwardly facing surfaces of said at least some of said treatment deck panel modules, whereby wear scanned information data scanned wear information data is developed indicative of wear levels of said upwardly facing surface the treatment panel modules, said scanning means being powered by said power means;
- control means including on-board control means carried on said mobile treatment deck wear scanning device controlling at least said transport means and said wear scanning means; said control means also including remote control means configured to be positioned, in use, external of said treatment deck being assessed; and
- transmission means operable between said on-board control means and said remote control means whereby said mobile treatment deck wear scanning device is controllable from said remote control means.

Preferably, a data wear level characteristic is established by comparing the scanned wear information data collected after a period of operational use of said treatment deck with pre-existing data established prior to said operational use of said treatment deck, with comparison to pre-existing data established prior to a period of use of the treatment deck. Preferably, the wear scanning means is configured to establish the wear level characteristic by scanning a physical, visual or sensory feature or characteristic of a said treatment panel module. Conveniently, the wear level characteristic is established in either or both said on-board control means or said remote control means.

Conveniently according to one possible aspect the transport means may include multiple wheels supporting the support structure, in use on the treatment deck. In a possible alternative arrangement, the transport means may include at least two (or more) spaced endless track movement means supporting said support structure, in use, on said treatment deck. In yet another possible alternative arrangement, the transport means may include a drone device with said support structure forming part of or carried by said drone device, said drone device being arranged, in use, to move above said treatment deck. With the drone device, the transport means may comprise drone propeller or blade rotors of any suitable configuration, the operation of which may enable the drone device to be steered over any desired predefined or pre-set course or over an operator-selectable course.

The scanning means is operable while the support structure moves along the selectable or predetermined course. Conveniently, the drone device may further include an open protective cage framework arrangement surrounding the drone device from collision damage by unintended engagement with surrounding parts of the treatment deck. The wear scanning means may be operable when the support structure is stationary relative to the treatment deck. In this mode of operation, the mobile treatment deck wear scanning device either hovers in a stationary position above the treatment deck or alternatively is physically supported on the upwardly facing surfaces of the treatment deck.

Providing a mobile treatment deck wear scanning device as aforesaid, allows an operator to place the wear scanning device on a treatment deck of treatment apparatus and to scan the surface of the deck for wear that might require replacement of one or more treatment panel modules, on a remote basis, that is, without the need for any person to directly enter the treatment apparatus to carry out such a review manually.

In yet another preferred arrangement, the wear scanning means may include a second wear scanning device carried by said body section and arranged to scan selectably zones above and/or around said body section. The second wear scanning device may include a wide angle all-round view rotatable observation camera arranged to convey viewed images via said transmission means to said remote control means. Conveniently, the wear scanning means includes a third scanning device including scanning means mounted to a telescopic support arm capable of being extended or retracted, the image forming means being adapted to transfer scanned information created thereby via said transmission means to said remote control means. The third scanning device may be articulated to a free end of said telescopic support arm whereby the third scanning device is directable in selectable directions. The aforesaid telescopic arm may be articulated to said body section to be selectably positioned in at least an upward direction, a downward direction, or a downwardly located position looking upwardly, for example, looking at underneath surface regions of a deck or other underneath locations including, but not limited to, cover parts between the panel modules and the supporting rail members or fastening elements and associated parts.

The transport means of the mobile scanning device may include multiple spaced wheels, multiple spaced endless transport tracks, gear rack and pinion transport means, or any combination of the aforesaid. The wheels or the endless transport tracks may be independently movable in a forward or a reverse direction on an individual basis. The transport means may be also steerably mounted to enable the mobile scanning device to be steered.

It is of course desirable that the mobile scanning device have a low as possible height such that movement on a treatment deck not be impeded by anything located immediately above the treatment deck being scanned. In this regard, it is desirable that the overall height of the mobile scanning device be less than about 500 mm, and more preferably less than about 300 mm.

In one preferred embodiment, at least one of the aforesaid first wear scanning device, said second scanning device, and/or said third scanning device is configured to create visual image data as said scanned information. In another possible preferred embodiment, at least one of the first wear scanning device, the scanning scanner device and/or the third scanning device is configured as a laser scanning device to create said scanned information. The or each said laser scanning device may be laser scanner typically a 3D laser scanner.

Conveniently, in another possible preferred embodiment, at least one of the first wear scanning device, the second scanning device, and/or the third scanning device is configured to include monitoring device means. The scanner means may include one or more sensor device means. Preferably, the sensor device means are arranged to sense wear indicator means positioned in a part of said treatment deck. The scanner means may include ultrasonic sensing means and/or RFID sensing means.

In a further preferred embodiment the transmission means transfers the scanned information to the remote control means immediately upon being created. In an alternative possible arrangement, the scanned wear information data is stored and transferred by said transmission means to the remote control means on request. In yet another possible arrangement, the scanned information is transferred to said remote control means on a time-based regime.

In yet another preferred embodiment, the mobile scanning device includes positional sensor means for determining positional information data for the first wear scanning device as an input to at least partly control said steerable transport means.

The remote control means needs to be positioned externally of any treatment apparatus containing the mobile screening device, but may itself be mobile or stationary relative to the treatment apparatus. Of course the disclosure anticipates providing mobile treatment apparatus that includes the remote control means, as well as a mobile scanning device not including the remote control means. It will of course be recognised that the remote control means would be required in use to properly externally control the scanning device.

Conveniently, with any of the above described possible embodiments for the transport means, the scanning means might be operable while the scanning means is moved by the transport means along the selectable or predetermined course. Alternatively, in another preferred arrangement, the support structure may be moved between stationary positions along said selectable or predetermined course, said scanning means being operable when located at each said stationary position. The support structure may be maintained in each of the stationary positions by a drone device (if used), above the treatment deck or alternatively, it may be supported on the treatment deck, regardless of the transport means used, when the scanning means is operable. If the scanning means is operable when the mobile treatment deck wear scanning devices is stationary on or above the treatment deck, the scanning means may be configured to be movable relative to the support structure when the scanning means is operable.

The mobile treatment deck wear scanning device may further include positional sensor means to enable desired direction movement on or over a said treatment deck being wear assessed. In addition, positional sensor means, when a drone device is used, may be provided to ensure the wear scanning means when elevated during operation use, is maintained at a substantially constant height spacing from the upwardly facing surface of the treatment deck.

It is possible to utilise differing forms of scanning devices as the scanning means. In one possible embodiment, the first wear scanning device may be configured to establish depth image data for establishing wear levels of said upwardly facing surface of the treatment deck. In this embodiment the first wear scanning device may be a 3-D laser depth scanning device. In a second possible preferred embodiment, the first wear scanning device is configured to assess dimensional size or shape of apertures in the upwardly facing surface of the treatment deck to create said scanned information. Conveniently with this embodiment the scanned information is compared to dimensional size or shape of said apertures prior to use of said treatment deck to establish a wear level assessment. In yet another third possible preferred embodiment, the first wear scanning device is configured to create and retain visual image data from said upwardly facing surface of said treatment deck to form said scanned information. Preferably, the visual image data is either visual images obtained from multiple directions or is mobile visual images taken, for example by a mobile video camera device or similar. The visual image data may then be subjected to photogrammetric analysis or any other 3D analysis utilising the visual image data including but not limited to computer stereo vision analysis and time of flight (ToF) analysis to establish wear level assessment relative to the upwardly facing surface of said treatment deck, upon comparison with pre-existing data established prior to a period of use of the treatment deck. In a fourth possible preferred embodiment the scanned information is subjected to Artificial Intelligence (AI) manipulation to establish wear level assessment relative to the upwardly facing surface of said treatment deck.

The power means of the mobile treatment deck wear scanning device may include a rechargeable battery means. In an alternative preferred embodiment the power means may include an umbilical cord connecting a connection element on the mobile treatment deck wear scanning device to an external power source. If a drone device is utilised, such an umbilical cord may be utilised as a means of not only supplying power but also preventing escape of the drone device into regions beyond the apparatus containing the treatment deck to be scanned. Alternatively, if a drone device is utilised powered by rechargeable battery means the drone device might still include a flexible tether means to prevent escape of the drone device during a scanning operation. Another possible alternative is to ensure the treatment deck being scanned is fully enclosed to prevent unintentional escape of the drone device.

Conveniently, the mobile treatment deck wear scanning device, regardless of the transport means utilised, may further include lighting means arranged to supply a predetermined light level to the lower zones below said support structure scanned by said first wear scanning device.

Providing a mobile treatment deck wear scanning device as aforesaid, allows an operator to place the scanning device on a treatment deck of treatment apparatus and to scan the surface of the deck for wear that might require replacement of one or more treatment panel modules, on a remote basis, that is, without the need for any person to directly enter the treatment apparatus to carry out such a review manually.

In yet another preferred arrangement, the scanning means may include a second scanning device carried by said body section and arranged to scan selectably zones above and/or around said body section. The second scanning device may include a wide angle all-round view rotatable observation camera arranged to convey viewed images via said transmission means to said remote control means. Conveniently, the scanning means includes a third scanning device including scanning means mounted to a telescopic support arm capable of being extended or retracted, the image forming means being adapted to transfer scanned information created thereby via said transmission means to said remote control means. The third scanning device may be articulated to a free end of said telescopic support arm whereby the third scanning device is directable in selectable directions. The aforesaid telescopic arm may be articulated to said body section to be selectably positioned in at least an upward direction, a downward direction, or a downwardly located position looking upwardly, for example, looking at underneath surface regions of a deck or other underneath locations including, but not limited to, cover parts between the panel modules and the supporting rail members or fastening elements and associated parts.

When the transport means of the mobile scanning device comprises multiple spaced wheels or multiple spaced endless transport tracks, the wheels or the endless transport tracks may be independently movable in a forward or a reverse direction on an individual basis. The transport means may be also steerably mounted to enable the mobile scanning device to be steered.

Preferably, the transmission means is operable to transfer the scanned wear information data from the mobile treatment deck wear scanning device to the remote control means.

It is possible to remove or transfer the scanned wear information data from the mobile treatment deck wear scanning device either after the wear scanning device is moved to an external position relative to the treatment deck being assessed or while the wear scanning device is located on the treatment deck being assessed. In an alternative possible arrangement, the scanned wear information data might be processed by the on-board control means and be viewable or accessible from the mobile treatment deck wear scanning device after the device has been moved to an external position relative to the treatment deck being assessed.

In a still further preferred embodiment, the present disclosure provides a method of determining wear levels of treatment panel modules positioned in adjacent side by side relationship to form a treatment deck, said method providing a remotely controllable treatment deck wear scanning device as described previously and positioning same on or over an upwardly facing surface of said treatment deck, said method involving moving said treatment deck wear scanning device along a selectable or predefined course on or over said treatment deck whereby wear scanning means including a first wear scanning device develops wear scanned information indicative of wear levels of said upwardly facing surface of the treatment deck, said wear scanned information being transferrable to remote control means.

It will be understood that any terms such as "comprises", "comprising", "includes" and/or "including" when used in this specification, specify the presence of stated features, items, steps, operations, elements and/or components, but do not preclude the presence of or addition of one or more other features, items, steps, operations, elements, components and/or groups thereof. The disclosure of this specification should also be regarded as including the subject matter of the claims as annexed.

DESCRIPTION OF PREFERRED EMBODIMENTS

Figure 1:
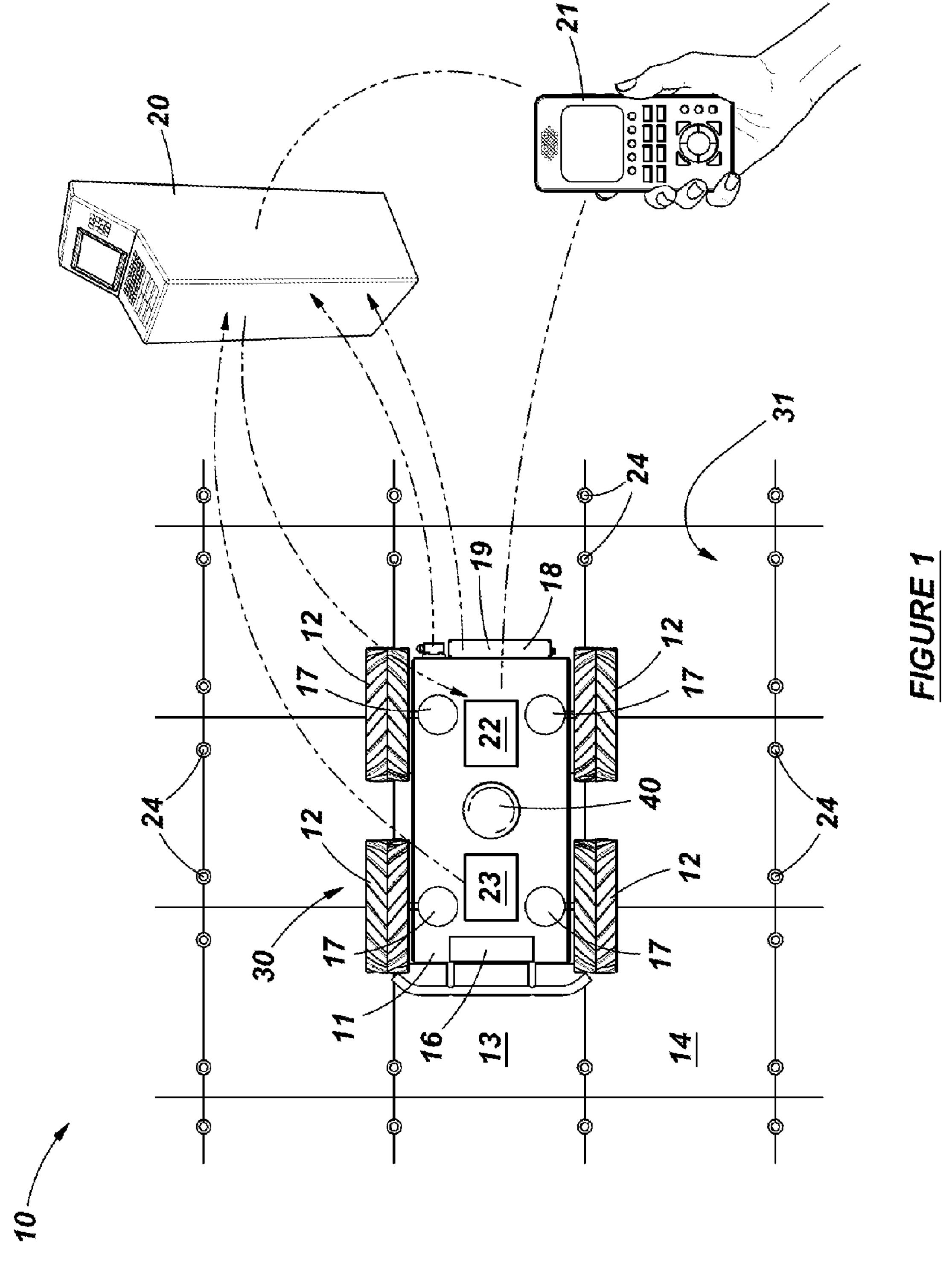
FIG. 1 is a diagrammatic illustration of mobile scanning apparatus capable of moving on a treatment deck in treatment apparatus to scan wear conditions of the treatment deck.
Figure 2:
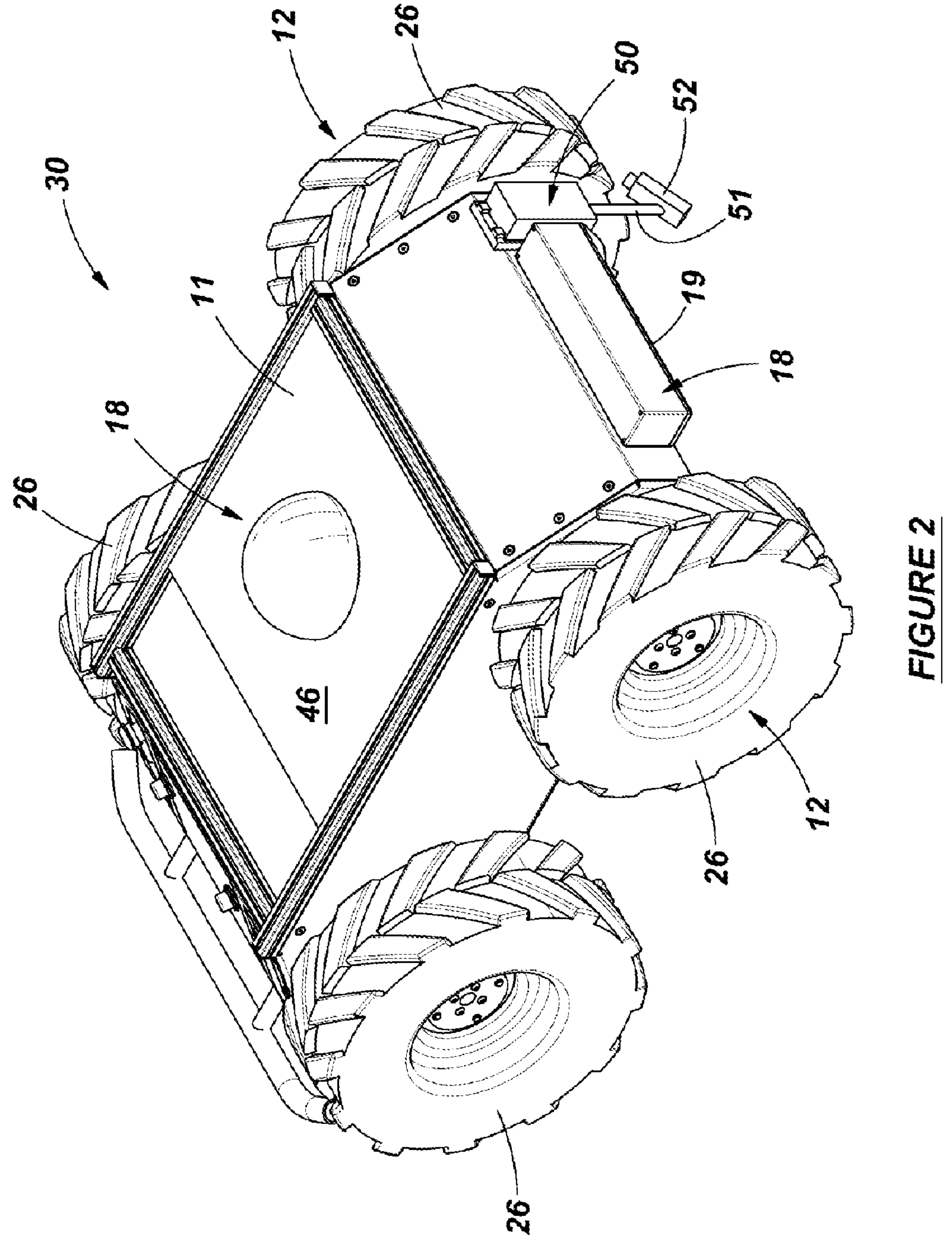
FIG. 2 is a perspective view of one practical preferred embodiment of a mobile scanning device utilised in the mobile scanning apparatus illustrated diagrammatically in FIG. 1.

Referring to the annexed drawings, preferred embodiments of mobile scanning apparatus 10 is shown (FIG. 1) comprised of a mobile scanning device 30 sized to be positioned on a treatment deck 14 of treatment apparatus 23. Typically each treatment deck 14 includes a plurality of treatment panel modules 13 arranged in a side by side pattern with adjacent edge faces abutting one another. The treatment panel modules 13 may have a square perimeter as illustrated or could have a rectangular perimeter as described earlier in this specification. FIG. 1 illustrates two opposed edges of each treatment panel module 13 being secured by securing pins 24 to underlying frame rails 25 (FIGS. 3/4), although, as described earlier, the present disclosure is equally applicable to treatment decks with their treatment panel modules being secured by any other fixing system.

The mobile scanning apparatus 10 may have remote control means 20, 21, that is, control means 20, 21 located separately from the treatment apparatus 23 or at least separate from the treatment deck 14. The remote control means 20, 21 may include either or both stationary remote control means 20 (FIG. 1) or a hand held mobile remote control means 21 (FIG. 1).

The mobile scanning device 30 forming part of the mobile scanning apparatus 10 includes a support structure 11 having a body section supported on transport means 12 which may be any number of wheels 26 or as a possible alternative any number of endless track transport means. The wheels 26 (or other forms of transport means) may be individually independently rotated or moved in a forward or rearward motion. The transport means 12 is steerable so that the mobile scanning device 30 can travel over all or selected parts of the treatment deck 14 under control commands provided from the remote control means 20, 21 either separately or together. The mobile scanning device 30 may follow a predefined course where all of the treatment panel modules 13 are scanned for wear, or can be individually directed by an operator. Alternatively the scanning device 30 may be configured to follow other predefined courses, such as, to specifically view wear to other sections of the treatment deck including the panel module fastening means such as the securing pins 24 or any other fastening elements that might be used. Steering may be achieved by steering means associated with at least some of the wheels 26 or by providing selective capability of reversing direction of at least some of the wheels 26.

The mobile scanning device 30 further includes drive means 17 of any suitable type for driving the transport means 12. The drive means 17 are conveniently powered by a power means or supply 16. In one preferred arrangement, the power means 16 may be a rechargeable battery. In another possible and less preferred arrangement, connection means (not shown) may be carried by the body section 11 with an umbilical cord (not shown) connecting the drive means 17 to a remote or external power source. In either case the power means 16 and external power source (if used) may be used to power any other operative part of the mobile scanning device 30 requiring power. It will be recognised that the upwardly facing surface 31 of the treatment deck 14 may be quite uneven either because projections intentionally formed thereon, by screening apertures therethrough (also intentionally formed but not shown in the drawings), or by wear or damage effects caused by use. The transport means 12 are designed to traverse such potentially uneven surfaces while still carrying out the necessary wear scans as described hereafter.

The mobile scanning device 30 further carries various scanning means 18 which includes a first wear scanning device 19 arranged to scan a lower zone 42 below the support structure 11. The scanning device 19 may be a 3D laser scanner that scans a width of the upwardly facing surface 31 of one or more of the treatment panel modules 13 as the support structure 11 moves over the treatment deck 14. When the scanning device 19 is a 3D laser scanner, it is capable of establishing scanned information indicative of depth of wear loss. Furthermore, the laser scanners do not require establishing any specific light level, however, if a scanning camera is utilised, a suitable form of light supply means (not shown) carried by the support structure 11 might also be used.

The various scanning means 18 may further include onboard positional sensor means to determine positional information data for the first wear scanning device 19 to aid in driving the transport means 12 for determining wear levels over a complete treatment deck.

The first wear scanning device 19 might also include scanning means to assess or review any known pre-existing wear level indicators that may have been imbedded in a treatment panel module 13, as mentioned in the "Background Art" section of this specification. This will also establish scanned information indicative of depth of wear loss to allow determination of whether a treatment panel module 13 should be removed and replaced. Still further, the scanning device 19 might also be utilised as certain wear levels that might result in pre-existing screening apertures or pre-existing recesses increasing in size after a period of use where such screening apertures or recesses exist. A second way of achieving this might be to scan the thickness of ligaments existing between pre-existing screening apertures or recesses extending downwardly from upwardly facing surface of a treatment panel module which would of course also indicate a possible unacceptable increase in screening aperture size.

Preferably the scanning means 18 might include a second scanning device 40 arranged to scan selectably zones above, to either side, and in front of or rearwardly from, the support structure 11. The second scanning device 40 may be arranged on an upper face 46 of the support structure 11 and be separately positioned relative to the first wear scanning device 19. The second scanning device may be an observation camera or other scanning device that is capable of viewing images or scanning image data by being rotatable through a wide angle including up to 360° and further be capable of viewing a hemispherical zone above and around the support structure 11.

Figure 6:
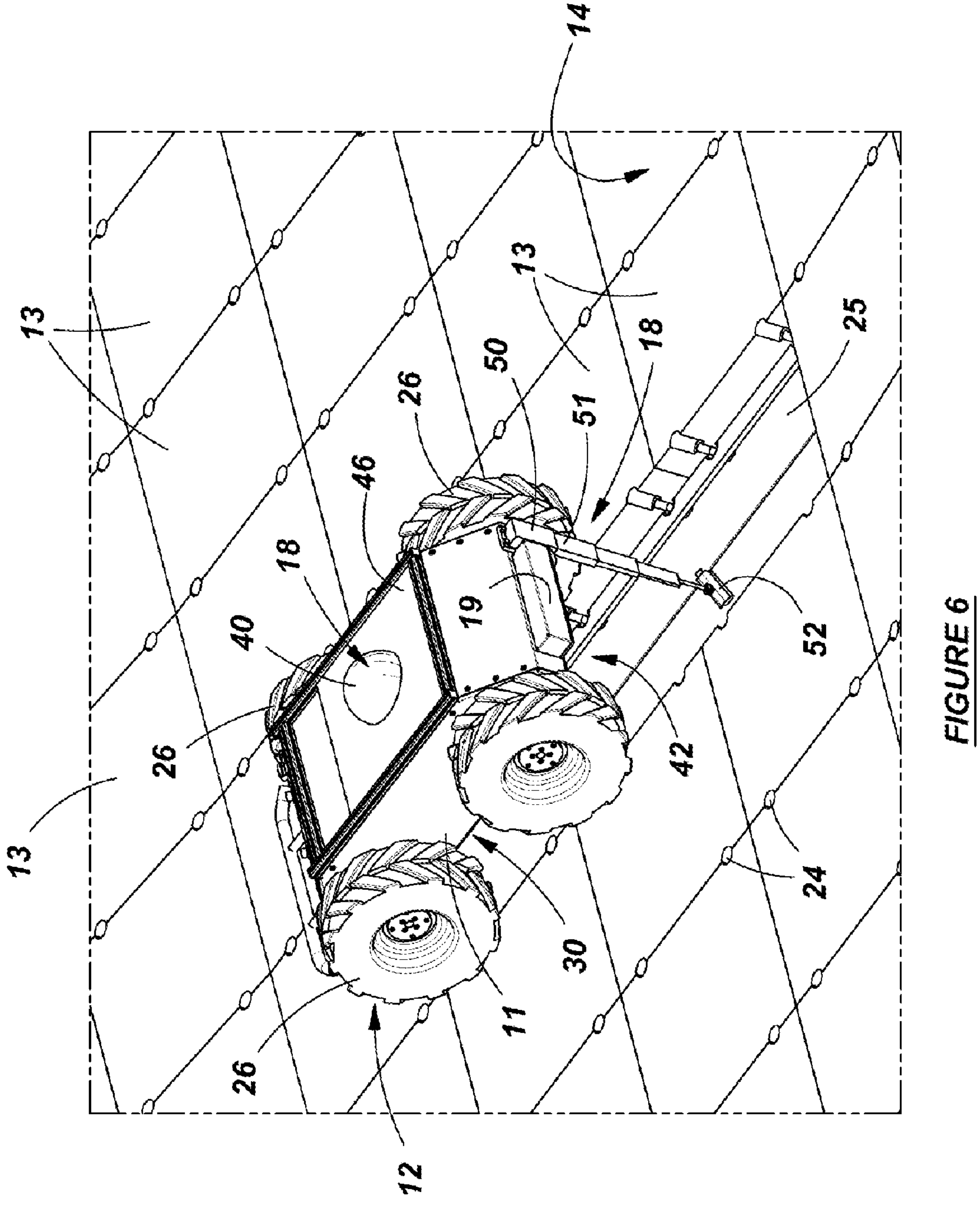
FIG. 6 is a perspective view similar to FIG. 5 showing some treatment panel modules removed and the mobile screening device in a different configuration of use.

In a further preferred embodiment, the scanning means 18 might include a third scanning device 50 including image forming means 52 mounted at a free end of a telescopic support arm 51 that is capable of being extended or retracted (FIGS. 1, 2, 5 and 6). The extendable telescopic arm 51 allows the third scanning device 50 to establish images underneath the treatment deck 14 being investigated by the arm 51 extending downwardly through an aperture in the treatment panel module 13 or by removing one or more treatment panel modules 13 (FIG. 6). By providing articulation between the image scanning means 52 of the third scanning device 50 and the arms 51, the image scanning means 52 can be swivelled or pivoted to enable different underneath views of the treatment deck 14 including the supporting frame rails 25 to be viewed and assessed. This may include, but not be limited to, assessing the condition of fastening points of panel module fixings, such as bolts and nuts and fixings such as "polysnap", "CP-HDB", "EL-HDB", "KBX", "Bolt-on", and pin type fixings where either a panel lug protrudes through rail holes with pin fixing, or a pin type fixing with a bush and center pin. The scanning means 52 may also assess the condition of rail covers, if they are used, which may be located between the supporting rails and the panel modules. Some rail covers also have protrusions that extend through the rail holes and the scanning means 52 can be used to assess the condition of any such protrusions if rail covers with such protrusions have been used. A possible further alternative may be to provide a controllable pivot or articulation between the upper end of the arms 51 and the support structure 11 so that the arm 51 can extend upwardly or in other directions if considered necessary.

The remote control means 20, 21 may be configured to transmit as a wireless control to transmit control instructions to a control 22 which provides necessary control instructions to operative parts of said mobile scanning device 30. Alternatively control instructions may be wirelessly provided directly to any of the individual operative parts of the mobile scanning device 30. Any images or scanned material may be wirelessly sent either directly from any operative part of the mobile scanning device 30 to the remote control means 20, 21 or through a common control function 23.

In a further possible arrangement, the mobile scanning device 30 might be constructed with two laterally spaced sub support structures each being supported by transport means comprised of wheels or endless transport track means arranged, in use, to travel on the upwardly facing surface 31 of the treatment deck 14. The mobile scanning device 30 may also include rails or similar members connecting the laterally spaced sub support structures, the rails or similar members carrying the support structure 11 in a manner whereby the support structure can be moved by any suitable means along the rails or similar members with the support structure 11 carrying the first wear scanning device 19 to, in use, scan the upwardly facing surface 31 of the treatment deck 14. Preferably, the rails or similar members may have sufficient length to span transversely the upwardly facing surface 31 of the treatment deck 14. Thus, the transport means 12 may move the mobile scanning device 30 longitudinally along the treatment deck 14 in a stepwise manner with the support structure 11 and first wear scanning device 19 traversing the treatment deck 14 at each stepped position to scan the upwardly facing surface 31. While it is preferred that the distance between the laterally spaced sub support structures approximately equals the width of the treatment deck 14, this is not essential as a lesser distance is also workable.

Figure 4:
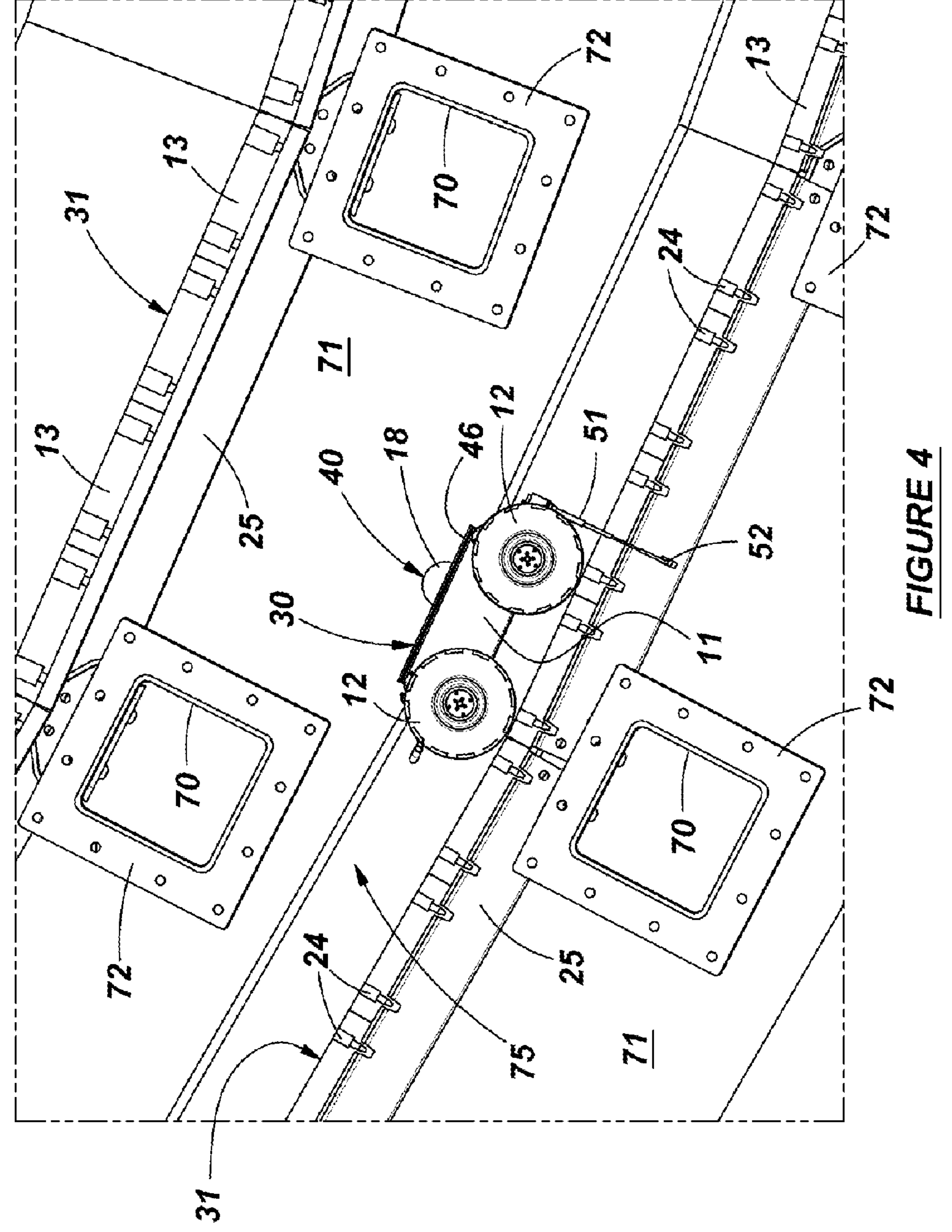
FIG. 4 is a detail view of part of FIG. 3 showing the mobile scanning device in a different use configuration.
Figure 5:
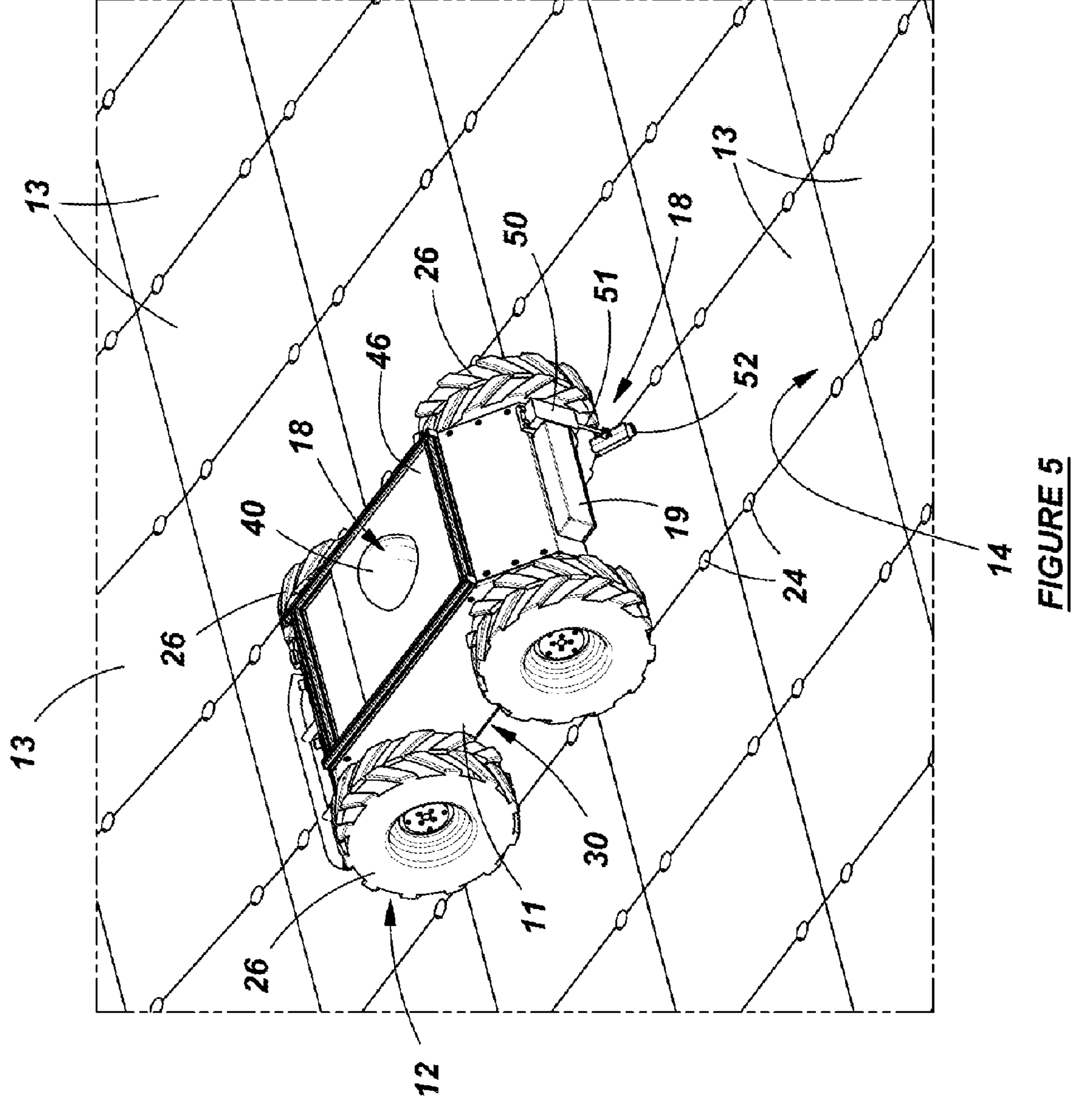
FIG. 5 is a perspective view of the mobile scanning device shown in FIG. 2 with the mobile scanning device positioned on a treatment deck.
Figure 7:
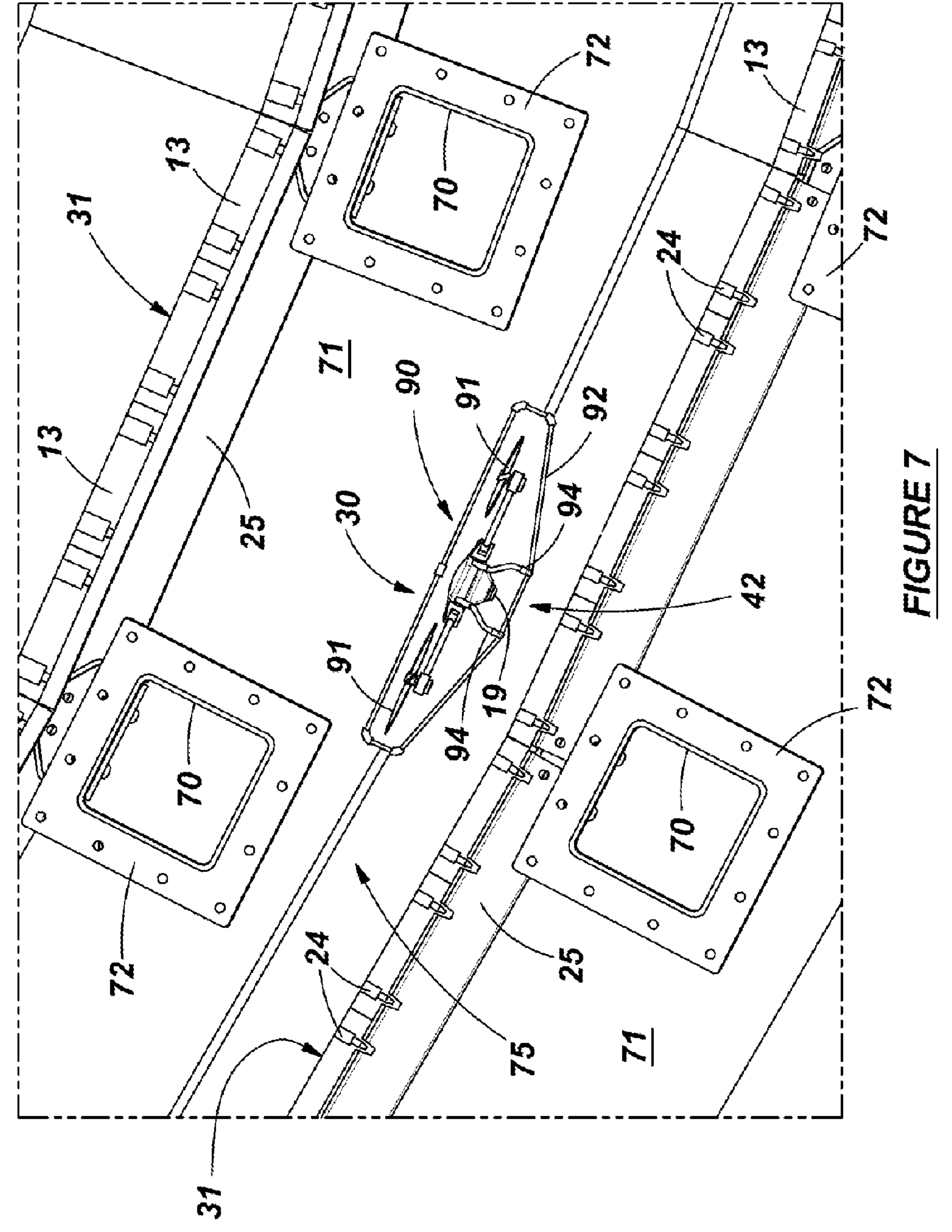
FIG. 7 is a detail view similar to FIG. 4 showing a possible alternative mobile scanning device.

FIG. 7 illustrates a view similar to FIG. 4 but representing schematically an alternative preferred embodiment of a mobile scanning device 30 being a drone device 90. The drone device 90 is configured to be flown over the upwardly facing surface 31 of the treatment deck 14 along a predefined course or a selected course by an externally located operator utilising transport means 12 being propeller or blade rotor device(s) 91 of any suitable configuration. A support structure 11 carries the propeller or blade rotor device(s) 91 and drive means (not shown) therefor powered by suitable power means (not shown) which may be rechargeable battery means or an external power supply provided via a flexible umbilical power supply cord. If used the flexible power supply cord might also ensure unintended and undesirable escape of the mobile scanning device 30 from the treatment apparatus 23. This may be achieved by a flexible tether (not shown) whether or not it is used to supply power to the drone device 90.

The support structure 11 of the drone device 90 will also carry a first wear scanning device 19 positioned to scan the lower zone 42 below the support structure 11 of the drone device 90, specifically including upwardly facing surface 31 of the treatment deck 14. The first wear scanning device 19 will be powered by the power means carried by the support structure 11 and will establish scanned wear information data indicative of wear levels of, at least, the upwardly facing surface 31 of the treatment deck 14. This may include, but not be limited to, depth variations of the upwardly facing surface of one or more treatment panel modules, and/or the size/shape of pre-existing apertures/recesses in the upwardly facing surface, and/or the size/shape of lands/ligaments between any such pre-existing apertures/recesses, relative to a configuration of such features prior to a period of use. The scanned wear information data will be transferred by transmission means carried by the drone device 90 to external/remote control means such as the control means 20 or 21. The transfer of this scanned wear information data may occur immediately it is established or alternatively in a piece meal fashion or still further, after a full scan of the treatment deck 14 has been completed.

The drone device 90 may include an open protective cage 92 surrounding all or at least critical parts of the drone device protecting same against damage potentially arising from unintended and unwanted collision with surrounding parts of the treatment apparatus 23. This might include at least the propellor blades or rotors. The vertical height of the drone device 90, including the open protective cage 92 if used, should be below the minimum height 93 of the zone above the upwardly facing surface 31 of the treatment deck. Preferably the vertical height of the drone device 90 is below 500 mm and preferably below 300 mm.

The first wear scanning device 19 may be operated as the drone device 90 is flown along the predetermined course or the selected course over the surface 31 of the treatment deck. In a possible alternative, the drone device 90 might be moved by being flown between discrete positions along the predetermined or selected course and is maintained stationary at each of such discrete positions. In this mode of operation, operation of the first wear scanning device 19 may occur while the drone device 90 is stationary seated on the surface 31. In this mode seating legs 94 might be provided as part of the protective cage 92 or as part of the support structure 11. In some situations, it may be desirable to mount the first wear scanning device 19 in a movable manner relative to the support structure 11 to achieve a wider area scanned by the first wear scanning device 19. This may also be desirable to ensure that the attitude of the first wear scanning device 19 remains constant relative to the upwardly facing surfaces of the treatment panel modules particularly when a treatment deck being assessed is significantly curved along its length. This movement may, for example, be a pivoting or tilting movement to maintain such a constant attitude for obtaining such scanned wear data. Particularly when using a drone device 90, it is desirable to maintain a constant height separation between the first wear scanning device 19 and the upwardly facing surfaces of the treatment panel modules forming the treatment deck being assessed. It is also desirable when a drone device 90 is employed, to maintain the constant attitude of the first wear scanning device 19 relative to the upwardly facing surfaces of the treatment panel modules.

The first wear scanning device 19 utilised on the drone device 90 is preferably adapted to create and retain visual image data from said upwardly facing surface 31 of the treatment deck 14 to form scanned visual information data. Conveniently, the transmission means transfers the scanned visual information data to control means 20 or 21 where the visual information data is converted by computer means utilising photogrammetric analysis or any other 3D analysis utilising the visual image data including but not limited to computer stereo vision analysis and time of flight (ToF) analysis to establish wear level assessment of the upwardly facing surface 31 of the treatment deck 14. While the above described arrangement is preferred, any of the previously described embodiments for the first wear scanning device 19 of the robotic mobile scanning device 30 might also be used if considered desirable.

Positional sensor devices may be mounted on the drone device 90 to enable the drone device itself or an operator to maintain a selected space between the first wear scanning device 19 and the upwardly facing surface 31 of the treatment deck 14 to be maintained. Similar positional sensors might be employed to prevent or minimise unintended and unwanted collisions with surrounding parts of the treatment apparatus.

Figure 3:
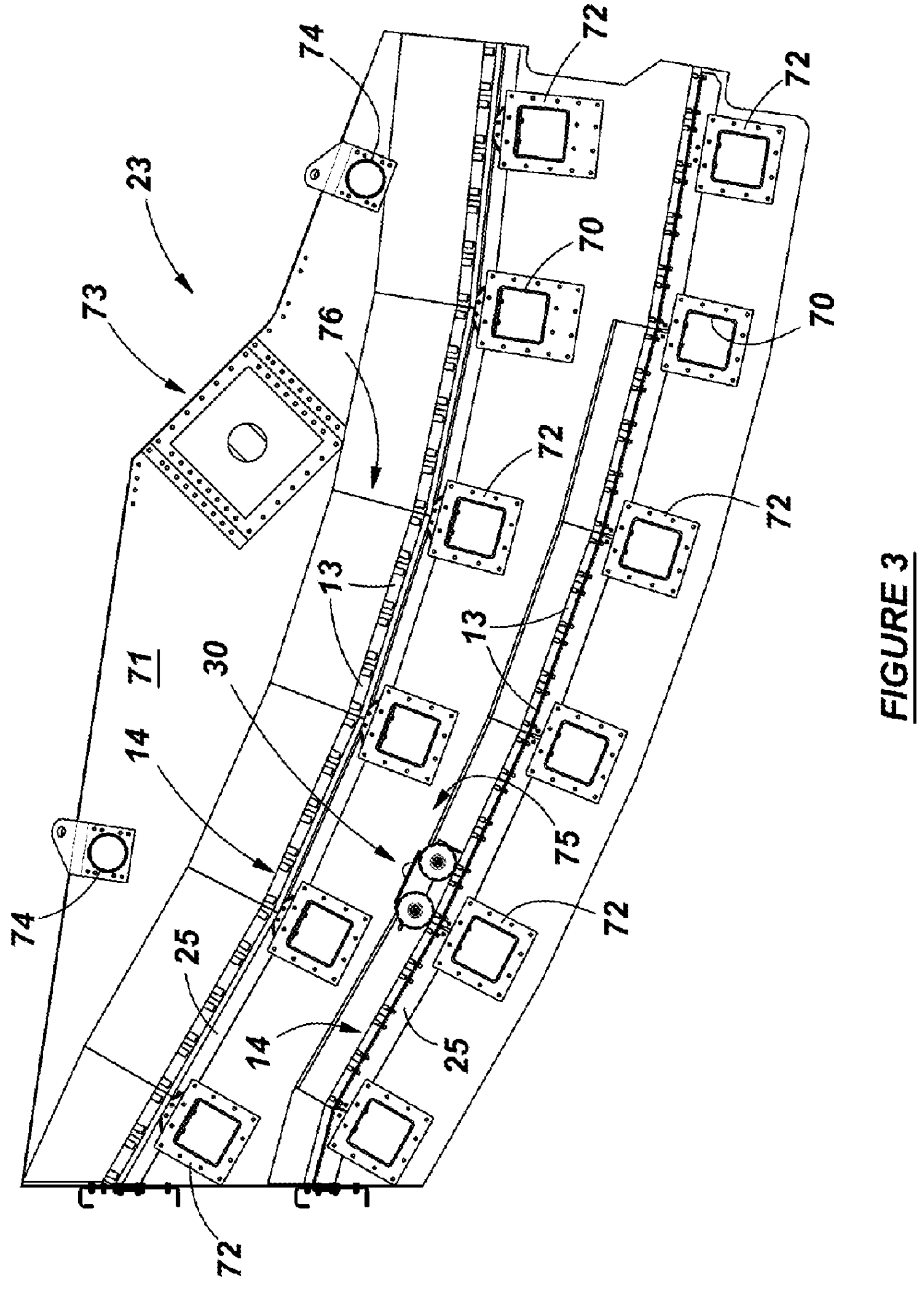
FIG. 3 illustrates a section side elevation view of treatment apparatus with a mobile scanning device positioned on a lower treatment deck of the treatment apparatus.

Referring to FIGS. 3, 4 and 7, a typical treatment apparatus 23 is illustrated, at least in part, including two stacked treatment decks 14. The upper treatment deck 14 is positioned immediately above the lower treatment deck 14. Each of the treatment decks 14 are constructed in a similar manner, consisting of a plurality of treatment panel modules 13 positioned in a side by side array and secured by securing pins 24 to transversely spaced longitudinally extending support rails 25. Of course, other fixing arrangements might be utilised as explained previously. The support rails 25 are supported by and connected to spaced transversely extending cross beams 70 secured to side walls 71 positioned on either side of the treatment apparatus 23. The treatment apparatus 23 is typically a vibratory type treatment apparatus 23 and will include some form of vibration creating mechanism 73 to impose a desired vibration on the treatment decks 14 in use. Normally cross bracing beams 74 are also connected between the side walls 71 and are positioned above the upper treatment deck 14. The support rails 25 for the treatment panel modules 13 are secured to peripheral flanges 72 that are secured to the cross beams at spaced positions therealong. The mobile scanning device 30, shown in other drawings, is positioned on the lower treatment deck 14 in the space 75 between the upwardly facing surface 31 of the lower treatment deck 14 and the lowest extremity of the upper treatment deck 14. It will be apparent that this space 75 is quite limited. The mobile scanning device 30 will also be required to work on the upper treatment deck 14, and while the area 76 above the upper treatment deck 14 is relatively more open, it is still restricted to some extent by the cross bracing beams 74 and the vibration creating mechanism 73.

Figure 8:
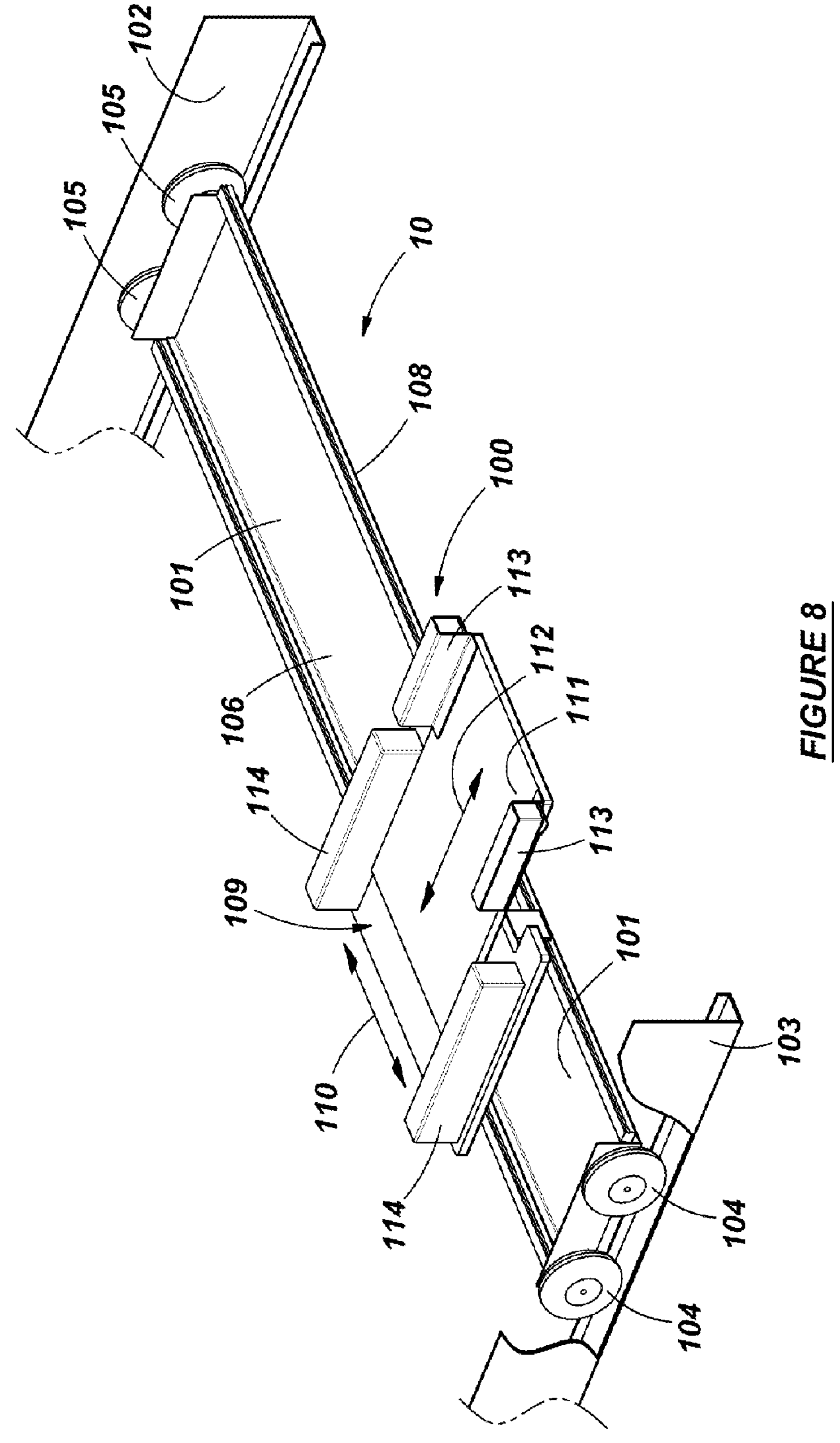
FIG. 8 is a perspective view showing a possible still further mobile scanning device.

FIG. 8 illustrates, at least partially, yet another possible preferred embodiment for mobile scanning apparatus 10 in accordance with this development. In this embodiment a mobile scanning device 100 is positioned on a support structure 101 operationally and selectively movable along guide tracks 102, 103, the support structure 101 being supported on driven transport means 104, 105 for operational and selective movement therealong. Conveniently, the guide tracks 102, 103 are, in use, mounted to side wall structures or other parts of the treatment apparatus 23 or to any other elevated support structure above a treatment deck 14 or similar treatment zone whereby the support structure 101 is positioned above the treatment deck 14 or similar treatment zone in treatment apparatus 23. Preferably, the guide tracks 102, 103 are positioned to maintain a uniform spacing between the support structure 101 and the treatment deck 14 as the transport means 104, 105 moves the support structure 101 along the guide tracks 102, 103. The guide tracks 102, 103 may take various forms including L and C or channel shaped in-cross section. The driven transport means 104, 105 are illustrated as one or more wheels but could include other configurations including crawler endless tracks, gear rack and pinion transport mechanism, any other known transport arrangement, or any combination thereof.

The preferred embodiment illustrated in FIG. 8 includes a support structure 101 having a first support part 106, in use, extending transversely fully across and above the treatment deck 14 to be scanned for wear conditions, the first part 106 having transversely extending second guide tracks 107, 108 to allow a second support part 109 to be moved in a defined direction 110 transversely across the treatment deck 14 to be evaluated. Appropriate controllable drive means (not shown) is provided to achieve operational movement of the second support part 109 in the direction of arrow 110. The second support part 109 carries a third movable support part 11, movable controllably in the direction of arrow 112, the third support part 112 carrying at least one wear scanning device 113, and may carry uniform lighting means and cleaning fluid supply means, to provide uniform lighting conditions on the treatment deck 14 and to clean debris from the treatment deck 14 being assessed for wear deteriorations. As with previously described embodiments, the mobile scanning apparatus 10 configured to include a mobile scanning device 100 according to FIG. 8, may have remote control means 20, 21, that is, control means 20, 21 located separately from the treatment apparatus 23, or at least separate from the treatment deck 14 or similar. The remote control means 20, 21 may include either or both stationary remote control means 20 (FIG. 1) or a hand held mobile remote control means 21 (FIG. 1). The mobile scanning device 100 may follow a predefined course, defined in part, by the guide tracks 102, 103, and by selectable or predefined movement of the second support part 109 in the direction of arrow 110 or of the third movable support part 111. In another possible arrangement, the wear scanning device or devices 113 may be fixed in position on the second support part 109. The mobile scanning device 100 may enable all of the treatment panel modules in any treatment deck or the like being evaluated for wear to be scanned or may allow for individual panel modules to be selected and evaluated for wear scanning. The mobile scanning device 100 may carry any desired ancillary tool operational means, storage facilities or the like 114 as may be required from time to time.

The embodiment illustrated in FIG. 8 illustrates an arrangement where the mobile wear scanning device 100 is essentially, in use, supported above the treatment deck that includes panel modules being evaluated for wear. That is, the mobile wear scanning device does not contact the treatment deck. The advantage of this difficulties of operating the wear evaluation device on a potentially worn or damaged surface are avoided. It should, however, be recognised that the support structure 101 and supporting transport means 104, 105, could also be used directly on the treatment deck being evaluated for wear. In this case, the transport means 104, 105 would directly contact the upper surfaces of the treatment deck. The length of the support structure 101 might be sufficient to span the transverse width of the treatment deck whereby the mobile wear scanning device 100 operates similarly to that just described with reference to FIG. 8. Alternatively, the length of the support structure 101 might be much shorter with the transport means being capable of steering sufficient to follow a defined or selected course on the treatment deck. The direction of movement might be any combination of longitudinal movement along the treatment deck and transverse movement across the treatment deck. Any suitable transport means 104, 105 might be used including those described previously relative to other embodiments. Similarly, previously disclosed control arrangements might also be used with these proposed embodiments. The embodiments disclosed above and illustrated in FIG. 8 may also use any features, where useful, as discussed earlier in relation to the other embodiments.

FIGS. 3 and 4 have been included to provide an example of treatment apparatus 23 to which the proposed mobile scanning apparatus 10 can be used. It will be apparent to those skilled in this art that there are many different forms of such treatment apparatus 23 known in this industry to which the mobile scanning apparatus can be used. Some variations include that the treatment decks 14 might be generally horizontal, inclined upwardly or downwardly, the fixing means for the treatment panel modules 13 might take many different forms, the number of treatment decks 14 could be varied from one, two, three or more. The treatment panel modules 13 might be of the screening type or might be provided without screening apertures to act to break the ore or similar material into smaller particle sizes. The representation of one form of treatment apparatus 10 should therefore be seen as illustrative only and not limiting.

It will be appreciated by those skilled in this art, that many variations and modifications to the features and arrangements disclosed herein to the mobile scanning apparatus 10 and the mobile scanning device 30 might be made within the scope of the accompanying claims. The scanning means 18 may include further scanning devices in addition to, or in replacement of one or more of the first wear scanning device 19, the second scanning device 40 and the third scanning device 50. While it is intended that one or more of the aforesaid scanning devices will be adapted to create visual images of regions viewed either by laser scanning or by camera means, other forms of scanning are envisaged and should be regarded as being included. One or more of the scanning devices might include sensor devices such as, for example, ultrasonic sensors, or any other means for assessing depth image data as a means of indicating wear or other deterioration conditions of a treatment deck, or any other part thereof. Moreover, in a still further embodiment, sensing or monitoring means might be provided to communicate with embedded devices (eg RFID embedded elements or other similar means) in the treatment panel module being assessed for wear, or in any other part of a treatment deck.

The claims defining the invention are as follows:

1. A method of assessing wear depth on a treatment deck made in part by individual treatment panel modules to determine whether an individual or multiple treatment panel modules should be replaced because of excess wear depth thereon, said method comprising:

providing an ore or quarry vibratory type treatment apparatus, the treatment module panels being positioned in adjacent side by side and end to end relationship to form the treatment deck of the ore or quarry vibratory type treatment apparatus, the treatment module panels including apertures therein;

providing a remotely controllable and moveable treatment deck depth of wear scanning device and positioning same on or over upwardly facing surfaces of said treatment panel modules forming an upwardly facing surface of said treatment deck, said treatment deck depth of wear scanning device including wear depth scanning means operatively directed towards said treatment deck;

remotely moving said treatment deck depth of wear scanning device along a selectable or predefined course on or over said treatment deck;

using photogrammetric analysis or laser time of flight analysis to establish scanned depth of wear information data and assessing a dimensional size and/or shape of the apertures to provide data indicative of depth of wear of the upwardly facing surfaces of at least some of said individual treatment panel modules for determining whether an individual or multiple of the treatment panel modules should be replaced; and said scanned depth of wear information data is transferred to operational control means at least partially located remotely from said treatment deck.

2. The method according to claim 1, wherein said treatment deck depth of wear scanning device is remotely operatively moved, at least in part, by transport means contacting said treatment deck, or by contacting guide tracks positioned adjacent said treatment deck.

3. The method according to claim 1, wherein said treatment deck depth of wear scanning device is remotely operatively moved by transport means arranged to elevate said treatment deck depth of wear scanning device above said treatment deck during at least a portion of operational movement along said selectable or predefined course.

4. The method according to claim 3, wherein said depth of wear scanning device is operable to establish said scanned depth of wear information data while elevated above said treatment deck.

5. The method according to claim 3, wherein said treatment deck depth of wear scanning device is operationally moved along said selectable or predefined course between spaced first positions where the treatment deck depth of wear scanning device is stationary and supported on said treatment deck separated by second movement sections where the treatment deck depth of wear scanning device is elevated above said treatment deck.

6. The method according to claim 1, wherein said operational control means includes at least a first operational control section positioned remotely from said treatment deck.

7. The method according to claim 6, wherein a determination of whether a said treatment panel module should be removed from said treatment deck and replaced is achieved by comparing said scanned depth of wear information data established after a period of use of said treatment deck with a pre-existing characteristic of configuration prior to said period of use of said treatment deck.

8. The method according to claim 1, wherein said operational control means includes a second operational control section carried with said treatment deck depth of wear scanning device, whereby said scanned depth of wear information data is either accessed after said treatment deck depth of wear scanning device has been moved to a position remote from said treatment deck being assessed, or is transferrable to said first remote operational control section as the data is established during operational use of the treatment deck depth of wear scanning device.

9. The method according to claim 1, wherein said scanned depth of wear information data includes establishing after a period of operational use of said treatment deck, by either or both:

determining a variation in size and/or shape of at least one pre-existing discrete aperture or recess extending downwardly from the upwardly facing surface of a said treatment panel module;

determining a variation in size and/or shape of a lands or ligaments existing between pre-existing discrete apertures or recesses extending downwardly from the upwardly facing surface of a said treatment panel module, by use of said depth of wear scanning device, a depth of wear that would indicate an unacceptable level of wear.

10. A treatment deck depth of wear scanning device comprising:

a support structure;

transport means arranged to carry said support structure over a selectable course or a predefined course on or over an upwardly facing treatment surface of a treatment deck in an ore or quarry vibratory treatment apparatus, the treatment deck having a plurality of adjacent treatment panel modules positioned in side by side and end to end relationship forming the treatment deck of the ore or quarry vibratory treatment apparatus, each of said treatment panel modules having an upwardly facing surface which together form the upwardly facing surface of the treatment deck, the treatment panel modules including apertures therein;

power means, the transport means of said treatment deck depth of wear scanning device being powered by the power means arranged to move said support structure over said predefined course or said selectable course;

depth of wear scanning means carried by said support structure including at least a first depth of wear scanning device to scan at least said upwardly facing surface of one or more said treatment panel modules positioned below said support structure, whereby scanned depth of wear information data is developed indicative of depth of wear of the treatment panel modules, the scanned wear information being subjected to photogrammetric analysis or laser time of flight analysis to access a dimensional size or shape of the apertures to obtain depth data establishing wear of the treatment panel modules for determining whether an individual or multiple treatment panel modules should be replaced;

control means including first on-board control means carried on said mobile treatment deck depth of wear scanning device controlling at least said transport means and said depth of wear scanning means; said control means also including second remote control means configured to be positioned, in use, external of said treatment deck being assessed; and transmission means operable between said first on-board control means and said second remote control means whereby said mobile treatment deck depth of wear scanning device is controllable from said second remote control means, said transmission means being also operable to transfer said scanned depth of wear information data from said treatment deck wear scanning device to said second remote control means.

11. The treatment deck depth of wear scanning device according to claim 10, wherein said transport means includes at least one of:

multiple wheels, at least two spaced endless track movement means, or an elevatable drone device.

12. The treatment deck depth of wear scanning device according to claim 11, wherein said transport means includes said multiple wheels and/or said at least two spaced endless track movement means, the or each in use, being configured to operationally contact the upwardly facing surface of said treatment deck.

13. The treatment deck depth of wear scanning device according to claim 10, wherein said depth of wear scanning means is operable either while said depth of wear scanning means is moved by said transport means along said selectable or predetermined course or while said depth of wear scanning means is held stationary relative to said treatment deck.

14. The treatment deck depth of wear scanning device according to claim 10, further including comprising positional sensor means arranged to enable desired directional movement on or over a said treatment deck.

15. The treatment deck depth of wear scanning device according to claim 10, wherein said transport means is an elevatable drone device, further including positional sensor means arranged to enable said depth of wear scanning means to be maintained at a substantially constant height spacing from the upwardly facing surface of the treatment deck, when elevated during operational use.

16. The treatment deck depth of wear scanning device according to claim 10, wherein a depth of wear level characteristic is established by comparing the scanned depth of wear information data collected after a period of operational use of said treatment deck with pre-existing data established prior to said operational use of said treatment deck.

17. The treatment deck depth of wear scanning device according to claim 16, wherein said depth of wear scanning means is configured to establish said depth of wear level characteristic by scanning a physical, visual or sensory feature or characteristic of a said treatment panel module.

18. The treatment deck depth of wear scanning device according to claim 10, wherein said transport means is configured, in use, to contact respective guide surfaces positioned on either side of the treatment deck.

19. A treatment apparatus comprising:

at least one vibrational treatment deck having an upwardly facing treatment surface formed by upwardly facing treatment surfaces of a plurality of adjacent treatment panel modules positioned in side by side and end to end relationship, said treatment panel modules being supported on and removably secured to support rail members; and a treatment deck depth of wear scanning device according to claim 10.

* * * * *